May 1, 1923.
J. C. BYERS
1,453,744
COTTON CLEANING AND CONDITIONING MACHINE
Filed June 7, 1921     2 Sheets-Sheet 2
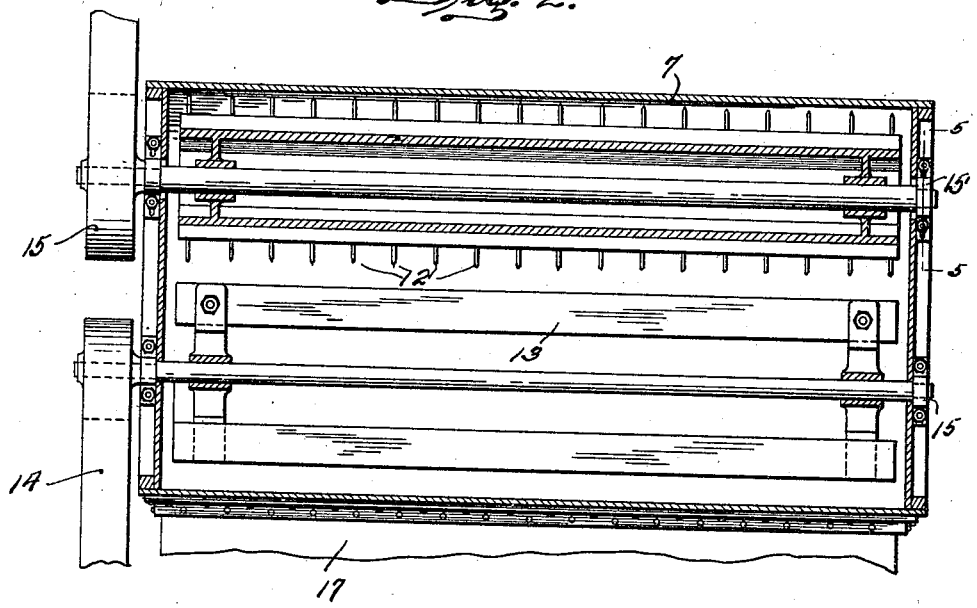
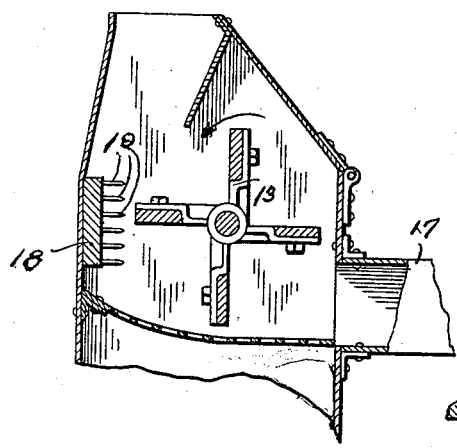
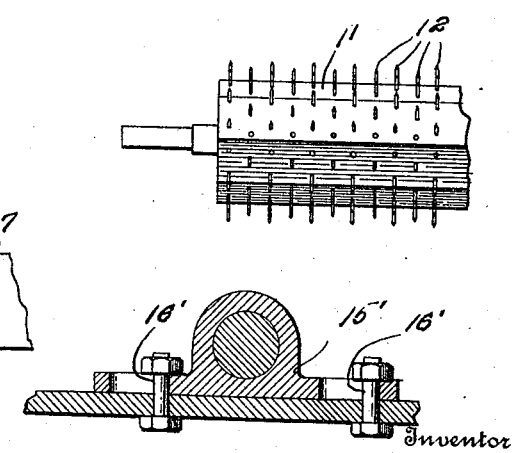
Inventor
J. C. Byers.
By Norman T. Whitaker
his Attorney Patented May 1, 1923.

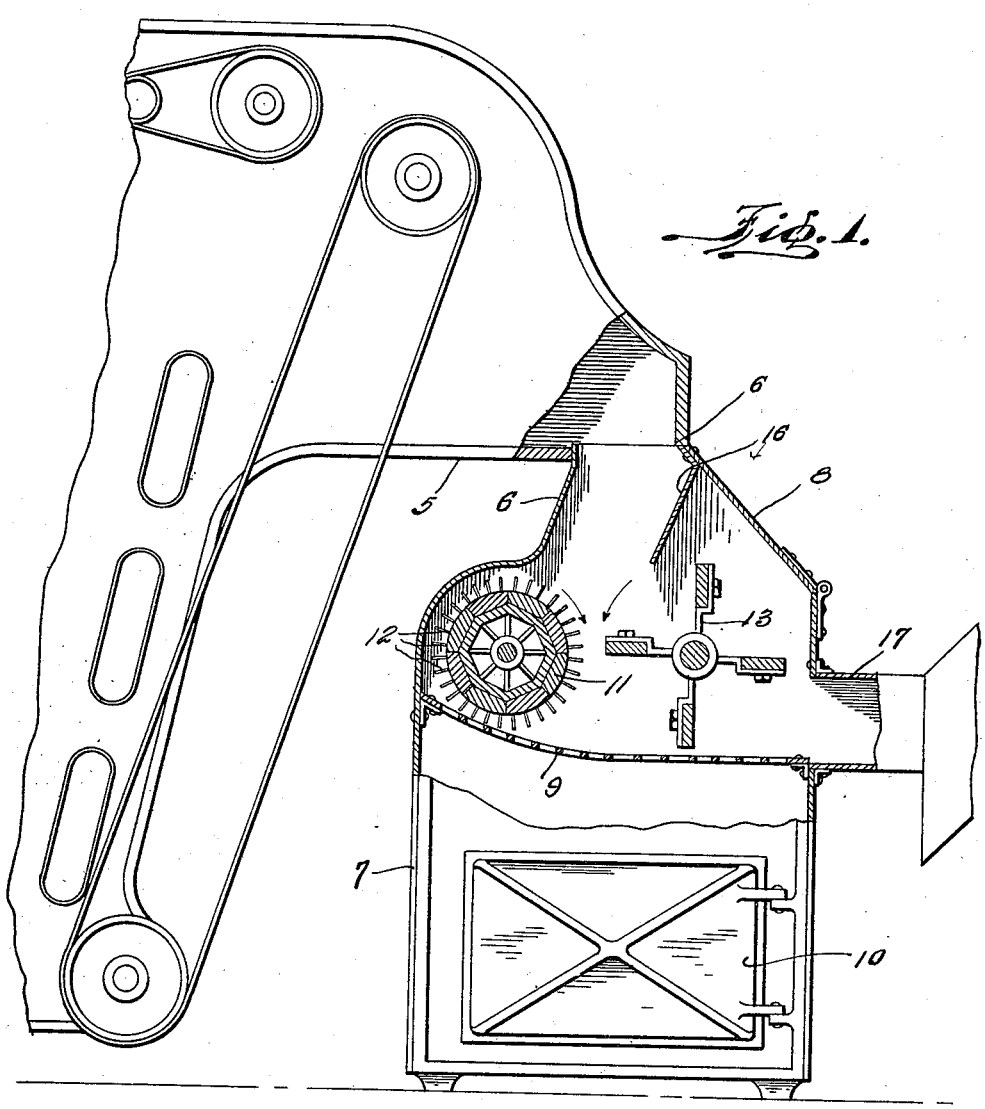

1,453,744

UNITED STATES PATENT OFFICE.

JAMES C. BYERS, OF HICKORY, NORTH CAROLINA.

COTTON CLEANING AND CONDITIONING MACHINE.

Application filed June 7, 1921. Serial No. 475,770.

*To all whom it may concern:*

Be it known that I, JAMES C. BYERS, a citizen of the United States, and a resident of Hickory, in the county of Catawba and State of North Carolina, have invented a new and useful Cotton Cleaning and Conditioning Machine, of which the following is a specification.

My invention is a combined cotton cleaning and conditioning machine.

The principal object of the present invention is to provide a machine wherein sand, leaves, seed and other foreign matter are separated from the cotton and the latter conditioned to increase the lustre and strength of the cotton fibre.

A further object of the invention is to provide a machine of this character which will do away with the usual beating process and which will permit a lower grade of cotton to be used, the finished product of which being of relatively great quality.

With the preceding and other objects and advantages in mind, the invention consists in the novel combination of elements, construction and arrangement of parts and operations to be more fully described hereinafter, claimed and illustrated in the accompanying drawings, wherein:

Figure 1 is a view partly in elevation and partly in section of the machine associated with an automatic hopper;

Figure 2 is a horizontal sectional view of the machine;

Figure 3 is a fragmentary sectional view of a modified form of the invention;

Figure 4 is a fragmentary elevation of the toothed cylinder used in connection with the invention; and Figure 5 is an enlarged sectional view taken on line 5—5 of Figure 2.

Referring in detail to the drawings wherein like characters of reference designate like parts throughout the several views, the numeral 5 designates an automatic hopper of well known construction provided with an outlet opening 6 at one side thereof.

My invention as reduced to practice comprises a chamber or casing 7 formed with a tapered upper end 8 which is open and communicates with the discharge opening 6 of the hopper 5. Extending horizontally in the casing 7 is a grating 9 through which sand, leaves, cotton seeds and other foreign matter fall to the bottom of the casing 7, the casing being provided with a door 10 whereby access may be had to the casing for removing the foreign matter.

Rotatable in the chamber or housing 7 above the grating 9 at the rear end thereof is a cylinder 11 carrying teeth or pins 12 which engage the cotton and disintegrate the same to separate the cotton seeds, leaves, sand and other foreign matter therefrom. Also journaled in the chamber or housing 7 and disposed in advance of the cylinder 11 is a fan 13, the latter and the cylinder 11 being driven in reverse directions by power belts 14 and 15. As illustrated in Figures 2 and 5 the cylinder and fan are mounted in bearings 15' adjustably mounted upon the chamber or housing 7 by bolt and slot connections 16'. In order to direct the cotton toward the toothed cylinder, an angularly disposed deflector plate 16 is secured to the tapered upper end of the chamber or housing 7 to one side of the outlet opening 6.

Leading from the front wall of the chamber or casing is a cotton conducting pipe 17 which leads to any desirable point.

In operation, the cotton passing from the hopper 5 is first directed against the teeth of the revolving cylinder by the air currents from the fan 13. As the cotton is carried downwardly on the toothed cylinder the same air currents now traveling in a reverse direction sucks or draws the cotton through the teeth to comb the seeds, leaves and other foreign matter therefrom, the latter passing through the grating 9. The cotton thus treated is drawn forwardly along the grating 9 and into the pipe 17 where it is conducted to the desired point by the air currents passing into this pipe. The air currents from the fan 13 in addition to directing the cotton against the teeth of the revolving cylinder and blowing the cotton through the pipe 17, serves to fluff and increase the lustre of the cotton and to increase the strength of the fibre thereof.

In Figure 3 a modified embodiment of the invention is illustrated. In this construction, the rotating toothed cylinder is eliminated and in lieu thereof a stationary member 18 is secured to the rear wall of the chamber or casing 7 and extending therefrom is a plurality of outstanding pins or teeth 19.

It is to be understood that the forms of my invention herein shown and described are to be taken as preferred examples of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with a cotton receiving hopper, of a chamber having communication with the hopper, a toothed cylinder rotatable in the chamber, a fan in the chamber adapted to blow the cotton against the toothed cylinder and subsequently suck the same therefrom, a perforated partition extending horizontally across the chamber beneath the toothed cylinder and fan through which foreign matter is adapted to pass, and a cotton conducting pipe leading from the chamber and disposed forwardly of the fan.

2. The combination with a cotton receiving hopper, of a chamber having communication with the hopper, a plurality of laterally disposed teeth arranged at one end of the chamber against which the cotton is directed, a fan in the chamber for forcing the cotton through the teeth, a perforated partition extending horizontally across the chamber beneath the fan through which waste products are adapted to pass, and a cotton conducting pipe leading from the chamber and disposed forwardly of the fan.

3. In a cotton cleaning and conditioning machine, a chamber having a cotton receiving opening in the top thereof and an outlet opening in the forward wall thereof, a rotary cylinder in the chamber and provided with outstanding teeth, a fan also in the chamber and disposed forwardly of the cylinder and adapted to force the cotton through the teeth, an angularly disposed deflector plate depending from the upper end of the chamber and disposed to one side of the inlet opening and adapted to direct the cotton toward the cylinder, and a grating extending horizontally across the chamber beneath the cylinder and fan through which waste products pass.

4. In a cotton cleaning and conditioning machine, a chamber having a cotton receiving opening in the top thereof and an outlet opening in the forward wall thereof, a toothed element arranged at one end of the chamber, a fan also journaled in the chamber forwardly of the toothed element and adapted to force the cotton through the teeth, an angularly disposed deflector plate depending from the upper end of the chamber and disposed to one side of the inlet opening and adapted to direct the cotton toward the toothed element, and a grating extending horizontally across the chamber beneath the toothed element and fan through which waste products pass.

5. A cotton cleaning machine including a casing having an inlet opening at its top and an outlet opening at one side thereof, a toothed member extending transversely within the casing and disposed below the inlet, a fan also in the casing and disposed forwardly of the toothed member and adapted to circulate air currents in a direction toward the toothed element and toward the outlet opening whereby the cotton will be combed and carried from the toothed element, and a grating extending horizontally in the casing below the fan and toothed member through which waste products are adapted to pass.

JAMES C. BYERS.